United States Patent
Matsuda

(10) Patent No.: US 6,941,068 B2
(45) Date of Patent: Sep. 6, 2005

(54) IMAGE PICKUP APPARATUS AND IMAGE PICKUP SYSTEM

(75) Inventor: Takaho Matsuda, Tochigi (JP)

(73) Assignee: Canon Kabushiki Kaisha, Tokyo (JP)

(*) Notice: Subject to any disclaimer, the term of this patent is extended or adjusted under 35 U.S.C. 154(b) by 154 days.

(21) Appl. No.: 10/404,528

(22) Filed: Apr. 1, 2003

(65) Prior Publication Data

US 2003/0189662 A1 Oct. 9, 2003

(30) Foreign Application Priority Data

Apr. 5, 2002 (JP) ......................................... 2002-104403

(51) Int. Cl.[7] ............................................... G03B 3/00
(52) U.S. Cl. ......................... 396/91; 396/104; 348/345
(58) Field of Search .......................... 396/91, 93, 104; 348/345, 353; 250/201.7, 201.8

(56) References Cited

U.S. PATENT DOCUMENTS

| | | | |
|---|---|---|---|
| 4,825,239 A | | 4/1989 | Suda et al. |
| 5,448,329 A | | 9/1995 | Nakata |
| 5,499,075 A | | 3/1996 | Sato et al. |
| 5,597,999 A | * | 1/1997 | Kinba et al. ............. 250/201.7 |
| 5,664,238 A | | 9/1997 | Nishiyama |
| 5,664,242 A | | 9/1997 | Takagi |
| 6,035,135 A | | 3/2000 | Okamura |
| 6,088,537 A | | 7/2000 | Ohtaka et al. |
| 6,198,506 B1 | | 3/2001 | Nakata et al. |
| 6,453,124 B2 | * | 9/2002 | Morimoto et al. ............ 396/91 |
| 2002/0039489 A1 | | 4/2002 | Matsuda |

FOREIGN PATENT DOCUMENTS

| | | |
|---|---|---|
| JP | H04-56936 | 2/1992 |
| JP | H-10-301020 | 11/1998 |
| JP | 11-38462 | 2/1999 |
| JP | 11-64919 | 5/1999 |
| JP | 2000-292684 | 10/2000 |
| JP | 2000-32148 | 11/2000 |

OTHER PUBLICATIONS

European Search Report dated Sep. 10, 2003.
English Abstract for Japanese Patent Application Laid–Open No. H10–301020 (Item A).
English Abstract for Japanese Patent Application Laid–Open No. 2000–292684 (Item B).
English Translation (by Japanese Patent Office) for Japanese Patent Application Laid–Open No. 2000–292684 (Item B).
English Abstract for Japanese Patent Application Laid–Open No. H04–56936 (Item C).
Search Report dated Jan. 17, 2005 issued in counterpart European Patent Application No. 04078141.
English Abstract for JP 11–64919 (Item A).

* cited by examiner

Primary Examiner—Judy Nguyen
Assistant Examiner—Arthur A Smith
(74) Attorney, Agent, or Firm—Morgan & Finnegan, LLP

(57) ABSTRACT

An image pickup apparatus which can perform focusing control with high speed and high precision is disclosed. The image pickup apparatus comprises a focus detection unit that detects a focusing state of the image-taking lens by phase difference detection method using light from the image-taking lens, and an in-focus judgment unit judges whether the image-taking lens is in an in-focus state or not, based on a result of a detection of contrast of an object image that has been taken with an image pickup device. Correction information, for correcting focusing control information of the image-taking lens that has been obtained by using the focus detection unit, is obtained based on information indicating the in-focus state of the lens obtained by using the in-focus judgment unit.

10 Claims, 9 Drawing Sheets

IMAGE PICKUP APPARATUS AND IMAGE PICKUP SYSTEM

BACKGROUND OF THE INVENTION

1. Field of the Invention

The present invention relates to an image pickup apparatus whose image-taking lens can be exchanged.

2. Description of the Related Art

For single lens reflex digital cameras whose lens can be exchanged, as in conventional single lens reflex cameras for silver halide film, a focus detection unit employing so-called phase difference detection method is commonly used. Furthermore, hybrid method have also been proposed, in which focusing control of the image-taking lens is performed by a combination of a focus detection unit employing so-called contrast detection method, as used in video cameras, and a focus detection unit employing phase difference detection method.

In phase difference detection method, a portion of a light flux from the image-taking lens is divided in two, and these two light fluxes are imaged onto respective line sensors. The moving direction and the moving amount of a focusing lens that are necessary for focusing on an intended focus plane (plane conjugated to an image pickup plane) is then calculated by detecting the displacement direction and the displacement amount of the two images on the line sensors. With such phase difference detection method, the moving direction and the moving amount of the focusing lens that are necessary for focusing can be calculated directly, so that focusing can be achieved promptly.

In contrast detection method, high-frequency components are extracted from an image signal generated based on the signal that is output from the image pickup device picking up an object image, the level of these high-frequency components is observed at predetermined sampling intervals, and the focusing lens is moved in a direction in which the level of the high-frequency components approaches a peak level, and the camera is judged to be in focus when the level of the high-frequency components has ultimately reached a predetermined peak range. With this contrast detection method, the in-focus judgment is made by using an image signal obtained based on the signal output from the image pickup device picking up the object image, so that focusing with respect to the object image can be performed at high precision.

However, in single lens reflex digital cameras whose lens can be exchanged, there is the possibility that sufficient focusing precision cannot be attained when using only a focus detection unit employing the above-described phase difference detection method. The principal reason for this is that the light flux forming the object image that is observed or taken is generally different from the light flux that is used by the focus detection unit.

Moreover, in focus detection units employing phase difference detection method, the focus position or the focus displacement, which is to be decided by the amount of aberration in longitudinal (optical axis) direction, is determined by converting it into a displacement of the image, which is associated with the aberration in lateral direction, so that if there is aberration in the image-taking optical system, then it is conceivable that there is a difference between the two, depending on the state of the aberration correction.

In order to solve this, a correction circuit for correcting the focus detection signal D representing for example the focus displacement amount with a correction factor C that is unique to each image-taking lens:

$$DC = D - C \quad (1)$$

All or a portion of the image-taking optical system is driven on the basis of the resulting corrected focus detection signal DC, and the lens is controlled such that the image pickup plane coincides with the best image-forming position.

However, in this method, a design correction factor is ordinarily used for this correction factor C, so that it does not include errors occurring at the manufacturing stage of the camera. Therefore, if errors occur at the manufacturing stage, they may become a cause of the problem that a sufficient focusing precision is not attained.

On the other hand, when using hybrid method, in which focusing control is performed by a combination of phase difference detection method and contrast detection method, in a single lens reflex digital camera whose lens can be exchanged, then a rough adjustment is carried out first by phase difference detection method, and fine adjustment is carried out by contrast detection method, thereby enabling a focusing that is to a certain degree fast and precise. However, with this hybrid method, the control up to the ultimate focusing is performed by contrast detection method, so that the time needed for the focusing cannot be shortened sufficiently.

Furthermore, in single lens reflex digital cameras having an optical finder, the destination of the light flux taken in from the image-taking optical system is switched chronologically to guide the light flux from the image-taking optical system to the finder optical system, the focus detection unit employing phase difference detection method and the focus detection unit employing contrast detection method, without compromising the light amount for those three destinations. Thus, the detection time may become long.

SUMMARY OF THE INVENTION

It is an object of the present invention to provide an image pickup apparatus with exchangeable lens, that can perform focusing control with high speed and high precision.

In order to attain this object, an image pickup apparatus in accordance with the present invention includes an image pickup device that receives an object image formed by an image-taking lens and by photoelectrically converts the object image, a focus detection unit that detects a focusing state of the image-taking lens by phase difference detection method using a light flux from the image-taking lens, an in-focus judgment unit that judges whether the image-taking lens is in an in-focus state, based on a result of a detection of contrast of an image that has been taken with the image pickup device, and a processing unit that determines correction information for correcting focusing control information of the image-taking lens that has been obtained by using the focus detection unit, based on information indicating the in-focus state of the lens obtained by using the in-focus judgment unit.

These and further objects and features of the invention will become apparent from the following detailed description of preferred embodiments thereof taken in conjunction with the accompanying drawings.

DESCRIPTION OF THE PREFERRED EMBODIMENTS

The following is an explanation of preferred embodiments of the present invention, with reference to the accompanying drawings.

Embodiment 1

Figure 1:
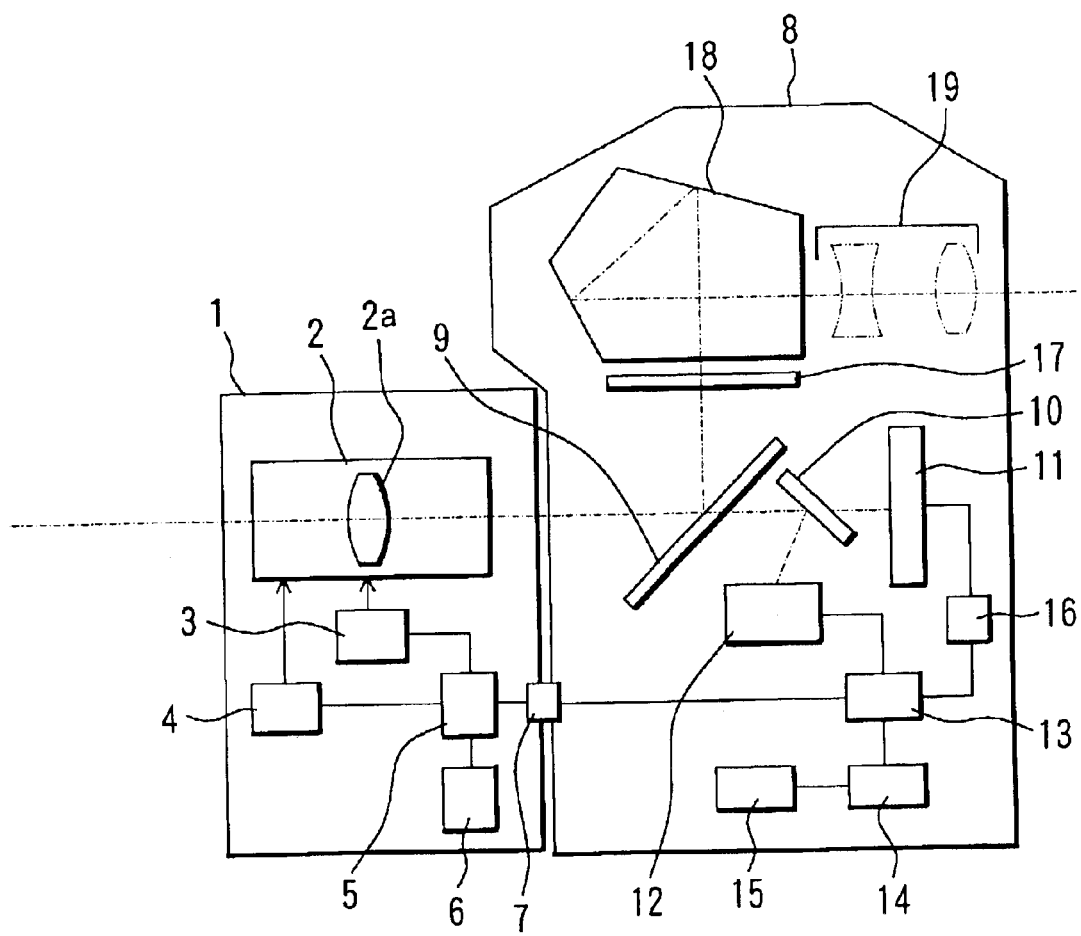
FIG. 1 is a diagram showing the structure of a camera system according to Embodiment 1 of the present invention.

FIG. 1 illustrates the structure of a single lens reflex digital camera system according to Embodiment 1 of the present invention. This camera system comprises an image-taking lens 1 and a single lens reflex digital camera (image pickup apparatus; referred to as "camera" in the following) 8. The image-taking lens 1 can be exchanged.

An image-taking optical system 2 serving as an objective lens is accommodated inside the image-taking lens 1 in FIG. 1. The image-taking optical system 2 comprises one or a plurality of lens units. The focus length can be changed and focusing can be performed by moving all or a portion of those lens units.

Numeral 3 denotes a focus driving unit that drives a focusing lens unit (referred to as a "focusing lens" in the following) 2a inside the image-taking optical system 2 for adjusting the focus. Numeral 4 denotes a focus position detection unit 4 detecting the position of the focusing lens 2a.

Numeral 6 denotes a memory, such as a ROM or the like, and numeral 5 denotes a lens control circuit, such as a CPU that performs the overall controls of the image-taking lens 1.

Although not shown in the drawings, the image-taking lens 1 also accommodates a zoom driving unit for driving a magnification variation unit (not shown in the drawings) arranged in the image-taking optical system 2 for varying of magnification, a diaphragm unit (not shown in the drawings), and detection units for detecting the positions of the zoom lens and the diaphragm.

The focus position detector 4 is configured by an encoder electrode provided on the lens barrel, which is rotated or moved in order to move the focusing lens 2a in the optical axis direction, and a detection electrode or the like contacting the encoder electrode. The focus position detector 4 outputs a signal corresponding to the position of the focusing lens 2a or its moving amount from a reference position. However, it should be noted that the focus position detector 4 is not limited to this structure, and it is also possible to use other types of detectors, such as optical or magnetic detectors.

On the other side, the camera 8 accommodates a main mirror 9, which can be advanced and retreated with respect to the image-taking optical path, and a finder optical system. The finder optical system is comprised of a focusing screen 17, a pentaprism 18 and an ocular lens 19. On the focusing screen 17, an object image is formed with the light that is reflected upward by the main mirror, when it is arranged in the image-taking optical path. The pentaprism 18 reflects and inverts the object image formed on the focusing screen 17.

Furthermore, on the rear side of the main mirror 9, a sub-mirror 10 is provided such that it can be advanced and retreated with respect to the image-taking optical path together with the main mirror 9. The sub-mirror 10 guides a light flux that have passed through a half-mirror portion of the main mirror 9 downward.

Furthermore, the camera 8 also accommodates a focus detection unit 12, a camera control circuit 13, and an image pickup device 11. The light flux that have been reflected by the sub-mirror 10 are guided to the focus detection unit 12. The camera control circuit 13, which may be a CPU or the like, performs the overall control of the camera 8. The image pickup device 11, which may be a CCD or a CMOS sensor or the like, performs photoelectric conversion of the object image formed by the image-taking optical system 2.

Furthermore, the camera 8 also accommodates an in-focus judgment unit 16, a calculation circuit 14, and a memory 15. The in-focus judgment unit 16 performs contrast detection of the photoelectrically converted image (the object image) using a signal output by the image pickup device 11, and judges whether the focusing lens 2a in the image-taking optical system 2 is at an in-focus position. The calculation circuit 14 calculates the difference between the in-focus position of the focusing lens 2a judged by the in-focus judgement unit 16 and the in-focus position of the focusing lens 2a calculated based on the output from the focus detection unit 12.

The memory 15, which may be an EEPROM or the like, stores the differential amount calculated by the calculation circuit 14 as correction information. It should be noted that the in-focus judgment unit 16 is similar to the devices known as focus detectors performing automatic focus control of the image-taking lens by using a so-called contrast detection method.

Numeral 7 denotes a communication contact provided at the image-taking lens 1 and the camera 8. Through this communication contact 7, various kinds of information can be exchanged and electric power can be supplied from the camera 8 to the image-taking lens 1, when the image-taking lens 1 and the camera 8 are assembled together. The camera 8 further includes a switch (not shown in the drawings) for setting a calibration mode for calculating and storing the above-mentioned correction information.

Figure 2:
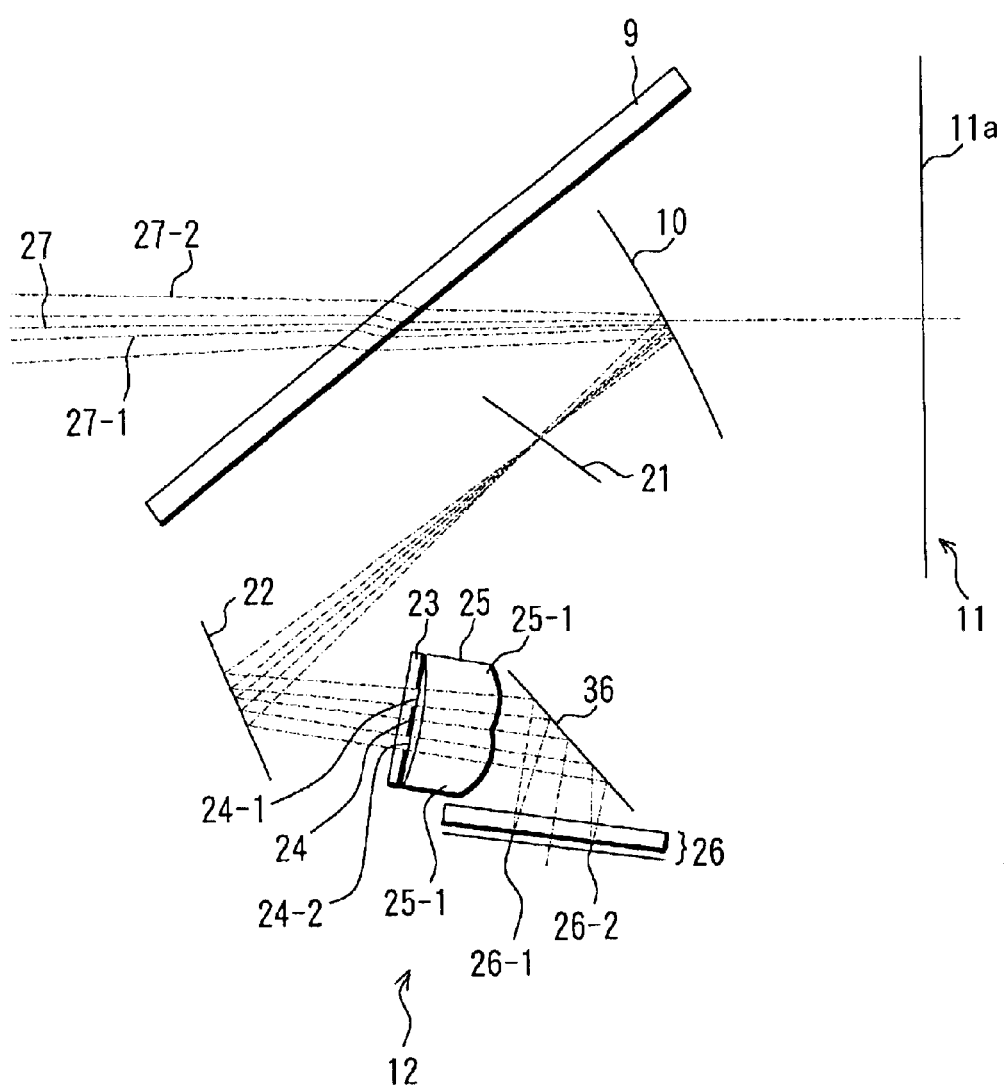
FIG. 2 is a diagram showing the structure of the essential parts of the focus detection unit in the camera system of Embodiment 1.

FIG. 2 illustrates the structure of the components of the optical system of the focus detection unit 12 shown in FIG. 1. In FIG. 2, numeral 27 denotes a light ray on the optical axis of the image-taking optical system 2, which passes from the image-taking optical system 2 through the main mirror 9 and to the image pickup plane 11a of the image pickup device 11. Numeral 21 denotes a paraxial image-forming plane due to the sub-mirror 10, which is at a position that is optically equivalent to the image pickup plane 11a. Numeral 22 denotes a reflection mirror, and numeral 23 denotes an infrared cutting filter.

Numeral 24 denotes an aperture stop having two aperture portions 24-1 and 24-2. Numeral 25 denotes a secondary image-forming optical system, including two lenses 25-1 and 25-2 that are arranged in correspondence with the aperture portions 24-1 and 24-2 of the aperture stop 24. Numeral 36 denotes a reflective mirror, and numeral 26 denotes a photoelectric conversion element (sensor unit). This photoelectric conversion element 26 includes two area sensors 26-1 and 26-2.

Here, the sub mirror 10 has a curvature, and has a convergent power (power is a reciprocal of the focal length) that projects the two aperture portions 24-1 and 24-2 of the aperture stop 24 near the exit pupil of the image-taking optical system 2.

Furthermore, the sub-mirror 10 is made by vapor depositing a metal film of, for example, aluminum or silver onto a surface of a glass substrate, such that light is reflected only at a necessary region. The sub-mirror 10 thus also serves as a visual field mask that restricts the range in which focus detection is carried out.

Also in the other reflective mirrors 22 and 36, a metal film of aluminum or silver for example has been vapor deposited only onto the necessary minimal region, so as to reduce the stray light entering the photoelectric conversion element 26. It should be noted that the regions of the reflective mirrors that do not have a function as reflecting surfaces may be coated with a light-absorbing coating.

Figure 3:
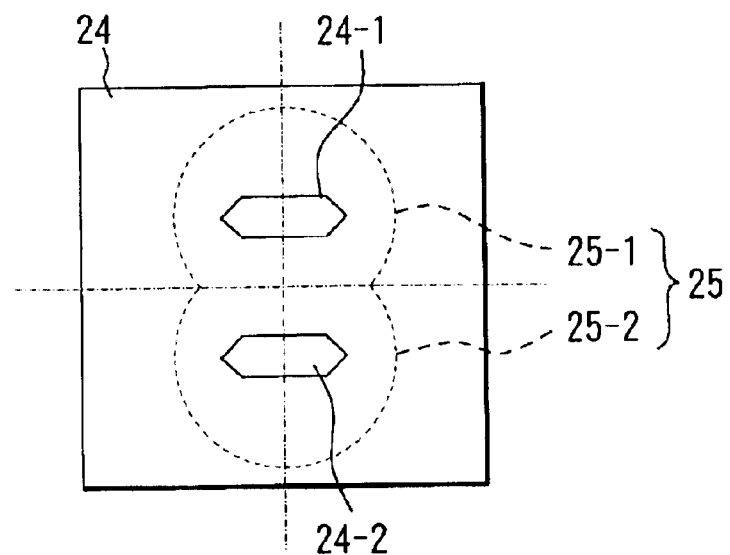
FIG. 3 is a plan view of the diaphragm shown in FIG. 2.

FIG. 3 is a diagram showing the aperture stop 24 in FIG. 2 from the direction in which light is incident. In the aperture stop 24, the two oblong aperture portions 24-1 and 24-2 are arranged next to one another in the direction in which their aperture width is smaller. The dotted line in FIG. 3 indicates the lenses 25-1 and 25-2 of the secondary image-forming system 25, which are arranged on the exit side of the aperture portions 24-1 and 24-2 of the aperture stop 24 and in correspondence with the aperture portions 24-1 and 24-2.

Figure 4:
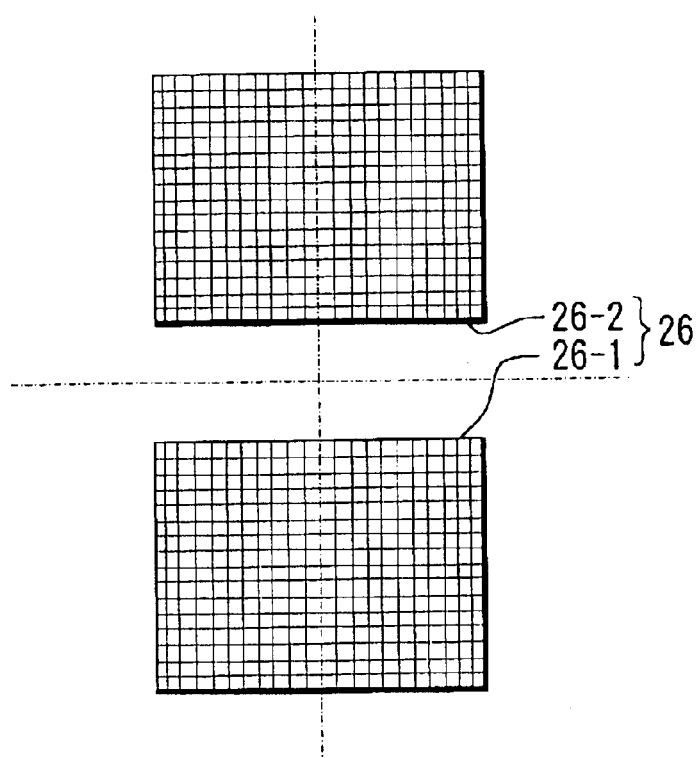
FIG. 4 is a plan view of the photoelectric conversion element shown in FIG. 2.

FIG. 4 shows the photoelectric conversion element 26 of FIG. 2, seen from the direction in which light is incident. The two area sensors 26-1 and 26-2 are sensors on which pixels are arranged two-dimensionally, as shown in FIG. 4, and the area sensors 26-1 and 26-2 are arranged next to one another.

As shown in FIG. 2, with the focus detection unit 12 and the optical system guiding light thereto configured as described above, after the light fluxes 27-1 and 27-2 from the image-taking optical system 2 have passed through the half-mirror surface of main mirror 9, they are reflected by the sub-mirror 10 in a direction that is substantially parallel to the tilt of the main mirror 9. After they have been directed rearward by the reflection mirror 22, they pass through the infrared cutting filter 23 and respectively through the two aperture portions 24-1 and 24-2 of the aperture stop 24. Then, the two light fluxes that have passed through the two aperture portions 24-1 and 24-2 of the aperture stop 24 are converged by the lenses 25-1 and 25-2 of the secondary image-forming system 25, and their direction is changed downward by the reflection mirror 36 before they reach the area sensors 26-1 and 26-2 on the photoelectric conversion element 26.

The light fluxes 27-1 and 27-2 in FIG. 2 are light fluxes that are images formed onto the center of the image pickup plane 11a, but also light fluxes that are images formed onto other positions reach the photoelectric conversion element 26 after passing through the same optical path. Therefore, light amount distributions (images) that are related to the object image, corresponding to the predetermined two-dimensional regions on the image pickup device 11 are formed on the area sensors 26-1 and 26-2 of the photoelectric conversion element 26.

Based on the light amount distributions of the two image that have been attained in the manner described above, in accordance with the detection principle of phase difference detection method, the focus detection unit 12 calculates, at each position on the area sensors 26-1 and 26-2, the separation direction and the separation amount of the two images, or in other words the relative positional relationship of the two images in vertical direction on the two area sensors 26-1 and 26-2 shown in FIG. 4. Thus, the focus detection unit 12 detects the focusing state (this is referred to as "focus detection" in the following) of the image-taking optical system 2, and outputs the result of the focus detection as the focus displacement amount (defocus amount) D.

In this embodiment, a correction factor that depends on the design of the lens model has been stored in advance in the memory 6 on the lens side, such that the driving position of the focusing lens 2a, for attaining an in-focus state, that is determined in accordance with this focus displacement amount D can be set to a value attaining the most precise in-focus state that is possible for the respective model of the image-taking lens 1. Using this correction factor, the camera 8 performs a correction such that the image pickup plane 11a matches with the best image-forming position at the time of image-taking.

However, the correction factor stored in the memory 6 on the lens side does not include individual differences among image-taking lenses or individual differences of the focus detection unit 12, even when they are of the same model type, so that when the design-dependent correction factor stored in the memory 6 is used directly, then it is difficult to attain a truly accurate in-focus state.

In order to address this and to adjust the design-dependent correction factor stored in the memory 6 on the lens side in this embodiment to a value with which focusing can be attained more precisely by reflecting those individual differences (that is to say, in order to adjust it to a value attaining focusing more precisely than with an in-focus driving position of the focusing lens 2 based on the focus displacement amount D detected by the focus detection unit 12), first, the contrast of the image signal obtained from the image pickup device 11 is detected while moving the focusing lens 2a with the focus driving unit 3 on the optical axis, and the in-focus position is judged by the in-focus judgment unit 16 based on this contrast state. Then, the differential amount between the in-focus position judged (detected) by the in-focus judgment unit 16 and the in-focus position calculated based on the output from the focus detection unit 12 is calculated by the calculation circuit 14, and this differential amount is stored in the memory 15 on the side of the camera 8 as correction information that is unique to the image-taking lens 1 that is currently mounted. It should be noted that here, this series of operations for obtaining the correction information unique to the image-taking lens 1 is also referred to as "calibration."

Figure 5:
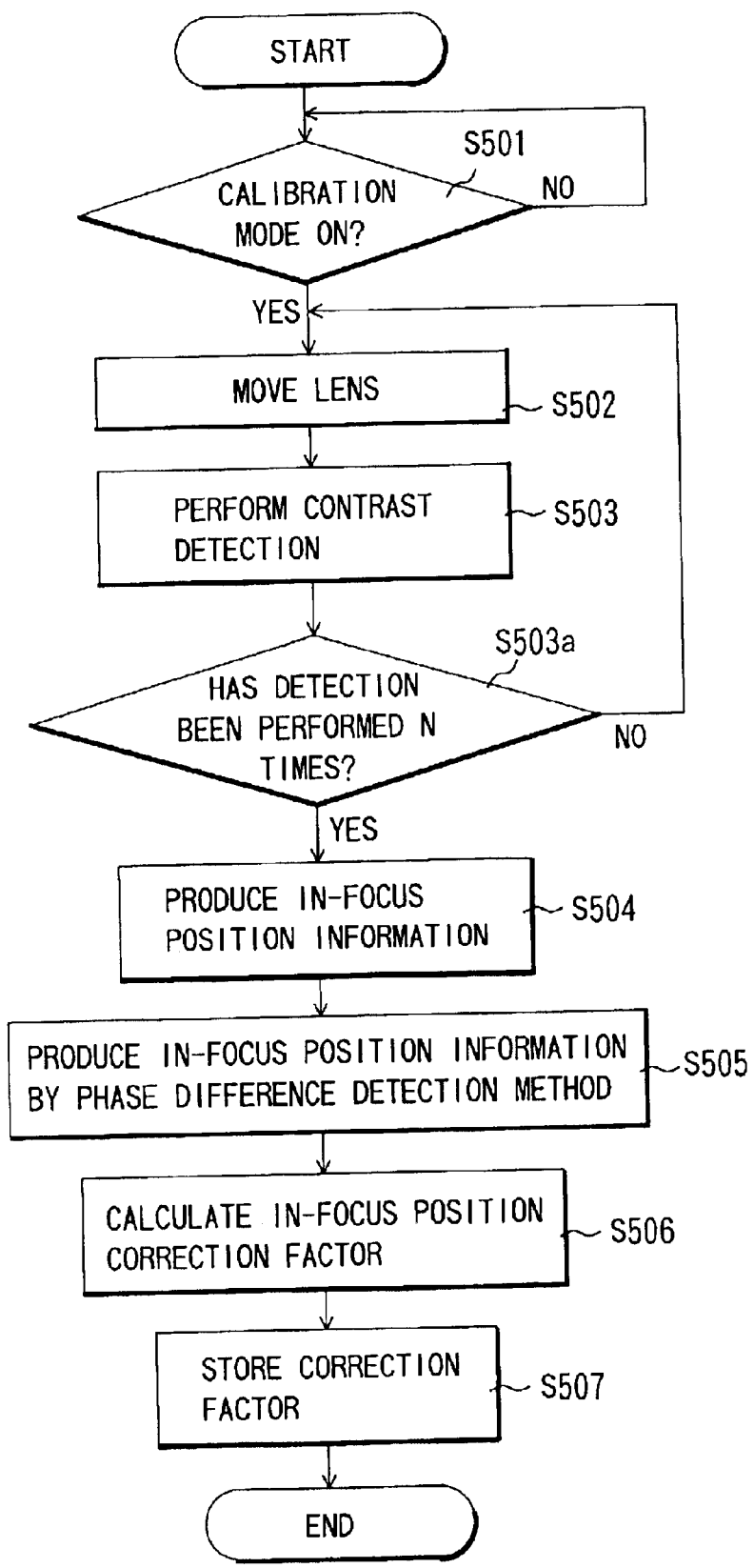
FIG. 5 is a flowchart illustrating the in-focus position calibration operation of this camera system.

Next, the operation of the camera system performing the above-described calibration is explained with reference to the flowchart in FIG. 5. In this embodiment, when an image-taking lens 1 has been mounted for the first time on the camera 8, or when it has been exchanged, and the user turns on the calibration switch (not shown in the drawings) provided on the camera 8, then the camera control circuit 13 enters the calibration mode, and the following procedure is executed.

After entering the calibration mode, the calibration operation is started automatically or when the user turns on the shutter switch (Step 501 [in the drawings, steps are marked by the letter "S"]).

First, the camera control circuit 13 sends a signal to the lens control circuit 5, and the focus driving unit 3 drives the focusing lens 2a into a predetermined position (Step 502). Next, the contrast of the image signal obtained from the image pickup device 11 is detected by the in-focus judgment unit 16 (Step 503). Then, a small moving (wobbling) of the focusing lens 2a in Step 502 and the contrast detection in Step 503 are repeated until a predetermined number N has been reached in Step 503 (Step 503a).

The in-focus judgment unit 16 judges, based on the N contrast detection results, the position of the focusing lens 2a at which the image signal with the highest contrast is attained, takes this position as the in-focus position, and sends a signal to the camera control circuit 13. The camera control circuit 13 obtains the position information from the focus position detector 4 at that time through the lens control circuit 5, and produces in-focus position information (Step 504).

Subsequently, the camera control circuit 13 lets the focus detection unit 12 carry out a focus detection by phase-difference detection method, and produces in-focus position information (Step 505) by adding to the position information from the focus position detector 4 a value obtained by converting the detection result for this case, or in other words the focus displacement amount (defocus amount D), into the amount that the focusing lens 2a needs to be moved in the in-focus direction.

The camera control circuit 13 lets the calculation circuit 14 calculate the in-focus position correction factor, which is the difference between the in-focus position information at the time when the system has been judged to be in focus by the in-focus judgment unit 16 and the in-focus position information obtained as the detection result with the focus detection unit 12 (Step 506).

Then, the in-focus position correction factor calculated by the calculation circuit 14 is stored in the memory 15 (Step 507). This concludes the calibration.

Here, when there is a time lag between Step 504 and Step 505, it is conceivable that an error occurs due to movement of the object, so that it is preferable that Step 504 and Step 505 are carried out substantially simultaneously.

Moreover, when calibration is carried out by using an ordinary object, as described above, then it is conceivable that an error occurs due to movement or the like of the object, so that it is also possible to provide the camera with an internal calibration chart and carry out the calibration by using this chart, or to display the calibration chart on the display of a personal computer connected to the camera and carry out the calibration by using this chart. Furthermore, calibration with even higher precision becomes possible when performing the calibration by using a projected light pattern of auxiliary light or the like.

In this embodiment, a device similar to a focus detector employing contrast detection method used in conventional video cameras was used for the in-focus judgment unit 16, but if the camera 8 is provided with a mechanical shutter, or if an image pickup device is used that cannot perform as an electronic shutter, and focus detection by conventional contrast detection cannot be carried out, then it is also possible to take a plurality of images and detect the contrast from these images.

It should be noted that the in-focus position correction factor may be stored alone in the memory 15 provided in the camera 8, or it may be stored as a numerical value including the value of the correction factor C in Equation (1).

Moreover, the in-focus position correction factor also may be stored by rewriting the correction factor C in the memory 6 provided in the image-taking lens 1, or it may be stored as a correction factor separate from the correction factor C.

The above-described calibration operation is performed for different object distances, and in-focus position correction factors associated with each object distance are stored in the memory 15. Thus, a focusing control with high precision can be performed regardless of the object distance.

Furthermore, it is also possible to perform the above-described calibration operation for all models of the image-taking lens, and to store the in-focus position correction factors together with identification information identifying the lens models in the memory 15.

Moreover, in the program for the calibration operation of this embodiment, the focus detection with the focus detection unit 12 is performed after producing in-focus position information by using the in-focus judgment unit 16. However, by performing the focus detection with the focus detection unit 12 before producing in-focus position information by using the in-focus judgment unit 16, the range over which the focusing lens is moved in Step 502 can be limited to the vicinity of the in-focus position detected by focus detection by phase difference detection method, so that the calibration can be concluded even faster.

Figure 6:
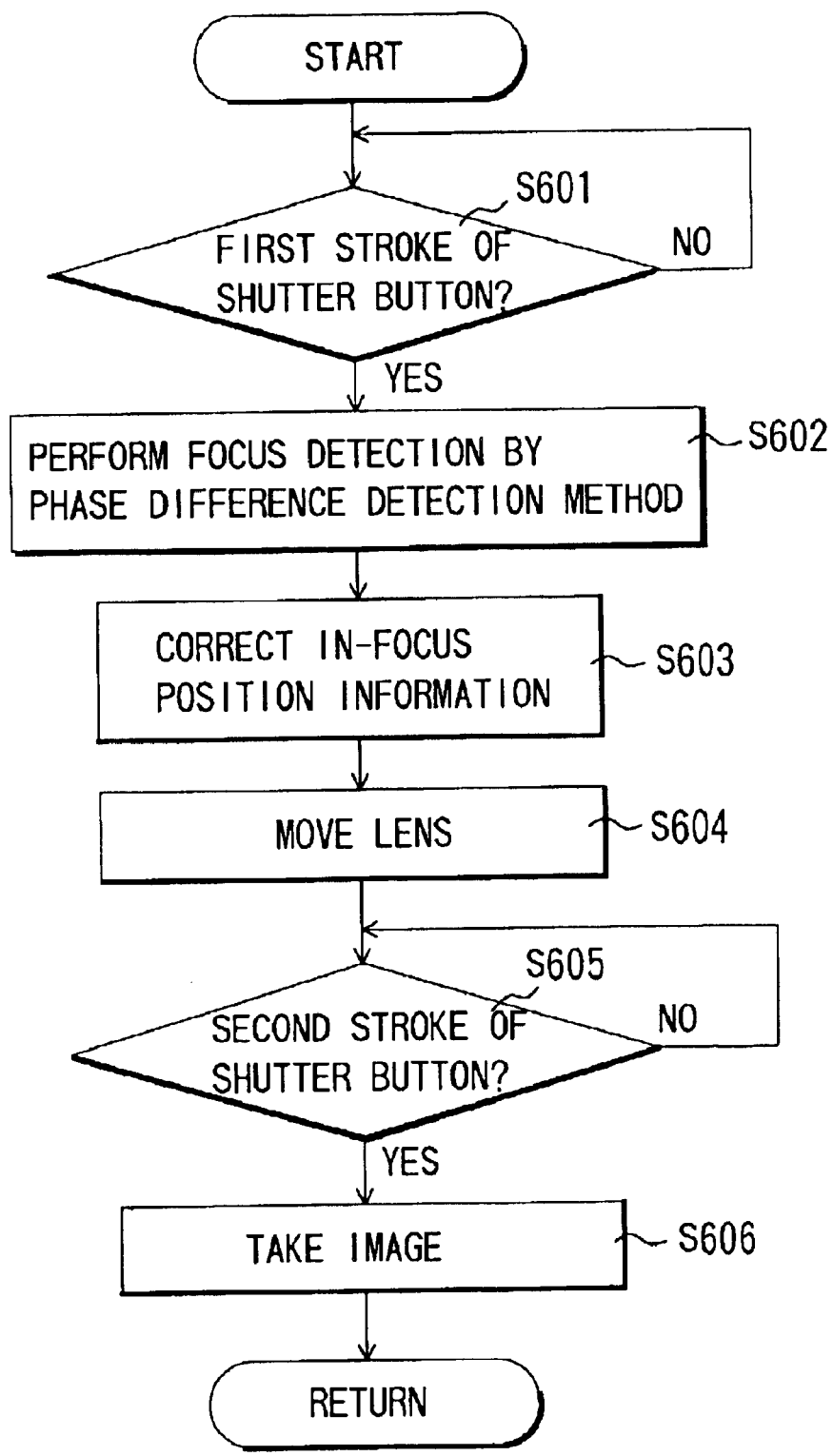
FIG. 6 is a flowchart illustrating the operation of the camera when, taking an image using a correction factor calculated with this in-focus position calibration.

Next, the operation of a camera actually taking an image by using the in-focus position correction factor that has been calculated and stored in the calibration mode is described with reference to the flowchart in FIG. 6.

Here, it is assumed that the in-focus position correction factor is stored separately from the correction factor C in the memory 15 in the camera 8.

When the shutter button of the camera 8 is subjected to a first stroke and pushed half down (Step 601) then the camera control circuit 13 lets the focus detection unit 12 carry out a focus detection by phase difference detection method (Step 602).

Next, the camera control circuit 13 produces in-focus position information (focusing control information), serving as the in-focus target position of the focusing lens 2a, from the moving amount of the focusing lens 2a calculated based on the focus detection result (focus displacement amount) according to the focus detection unit 12 and the current position information of the focusing lens 2a detected by the focus position detector 4. Further, the camera control circuit 13 corrects the in-focus position information by using the design-dependent correction factor C that is unique to the image-taking lens 1 and the in-focus position correction factor produced in the calibration mode (Step 603).

Next, the camera control circuit 13 transmits a driving command based on the corrected in-focus position information to the lens control circuit 5. The lens control circuit 5 moves the focusing lens 2a via the focus driving unit 3 until the position corresponding to the corrected in-focus position information is detected by the focus position detector 4, thus concluding the focusing operation (Step 604).

After that, when the shutter button is subjected to a second stroke and pushed completely down (Step 605), an image is taken (Step 606).

In this manner, in the present embodiment, the difference (correction information) between the in-focus positions that are obtained in the calibration mode with the focus detection unit 12 carrying out a focus detection by phase difference detection method and with the in-focus judgment unit 16 carrying out an in-focus judgment by contrast detection method is stored, and the focusing control information obtained by the focus detection unit 12 is corrected with this stored correction information when taking an image. Thus, a focusing control of high-precision becomes possible while maintaining the high speed due to phase difference detection method.

Furthermore, by storing the in-focus position correction factor in the memory 15 inside the camera 8 as a numerical value including the correction factor C as described above, it is not necessary anymore to transmit the correction factor C between the image-taking lens 1 and the camera 8, so that an even faster focusing control becomes possible.

Embodiment 2

Figure 7:
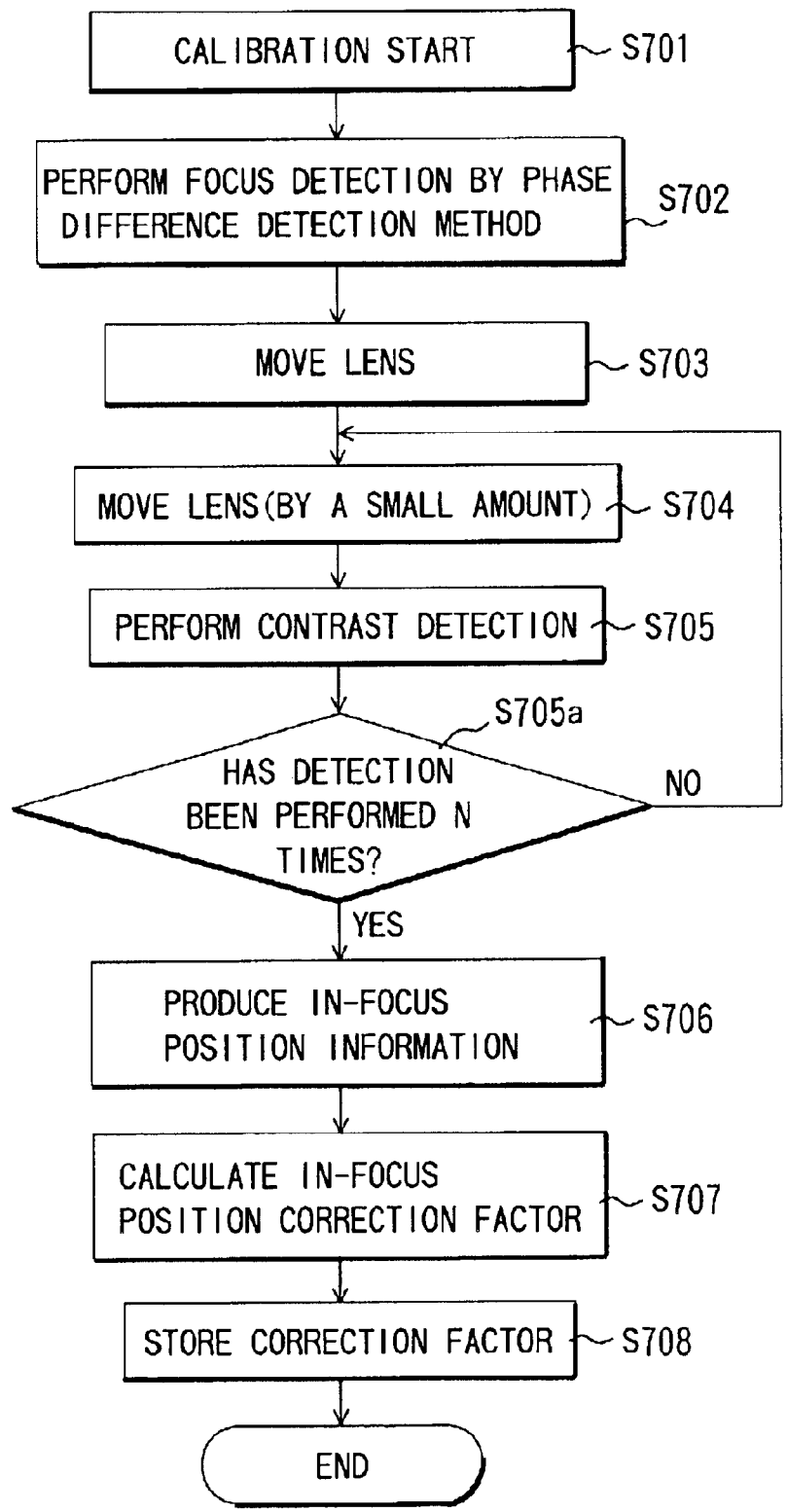
FIG. 7 is a flowchart of the in-focus position calibration operation in a camera system according to Embodiment 2 of the present invention.

FIG. 7 is a flowchart of the calibration operation in a single lens reflex digital camera system according to Embodiment 2 of the present invention. It should be noted that the structure of this camera system is similar to that of Embodiment 1. Therefore, structural elements that are shared with Embodiment 1 are assigned the same numerals as in Embodiment 1. In this embodiment, the in-focus position correction factor is calculated automatically without setting a calibration mode.

When the calibration starts (Step 701), first, the camera control circuit 13 lets the focus detection unit 12 perform focus detection employing phase difference detection method, and in-focus position information is produced in a similar manner as in Embodiment 1 (Step 702). Then, based on this in-focus position information, the focusing lens 2a is driven through the lens control circuit 5 and the focus driving unit 3, and a focusing operation is carried out (Step 703).

Next, the camera control circuit 13 moves the focusing lens 2a, which is in the position into which it has been moved by the focus driving unit 3, by a tiny amount in Step 703 (Step 704).

In this situation, the camera control circuit 13 lets the in-focus judgment unit 16 carry out a contrast detection (Step 705), and after Step 704 and Step 705 have been repeated a predetermined N times (Step 705a), in-focus position information is produced from the position (detected by the focus position detector 4) of the focusing lens 2a at which the image signal has the highest contrast of all detected contrasts (Step 706).

Next, the in-focus position correction factor, which is the difference between the in-focus position information obtained at Step 706 and the in-focus position information obtained by using the focus detection unit 12 at Step 702, is calculated with the calculation circuit 14 (Step 707).

Then, the calculated in-focus position correction factor is stored in the memory 15 (Step 708). This operation concludes the calibration.

Regarding the timing at which the calibration is started, it is possible to employ a method of starting the calibration while the user does not operate the shutter button, and interrupt the calibration when the user has pushed down the shutter button by the first stroke.

Furthermore, when actually taking an image, it is also possible to use a method of taking a plurality of images at a shutter speed that is not greater than ½ the set shutter speed while moving the focusing lens 2a (in other words, with different focus states), then selecting the taken image with the best focus, and then correcting the brightness of the best focused image by image processing after the last image has been taken, to obtain an image that is equivalent to an image taken at the set shutter speed.

The actual image taking operation by using the value for the in-focus position correction produced with the above-described calibration is similar to the one explained for Embodiment 1.

Embodiment 3

In addition to the calibration relating to the in-focus position described in the foregoing Embodiments 1 and 2, it is also possible to perform a calibration relating to the exposure of the camera.

Figure 8:
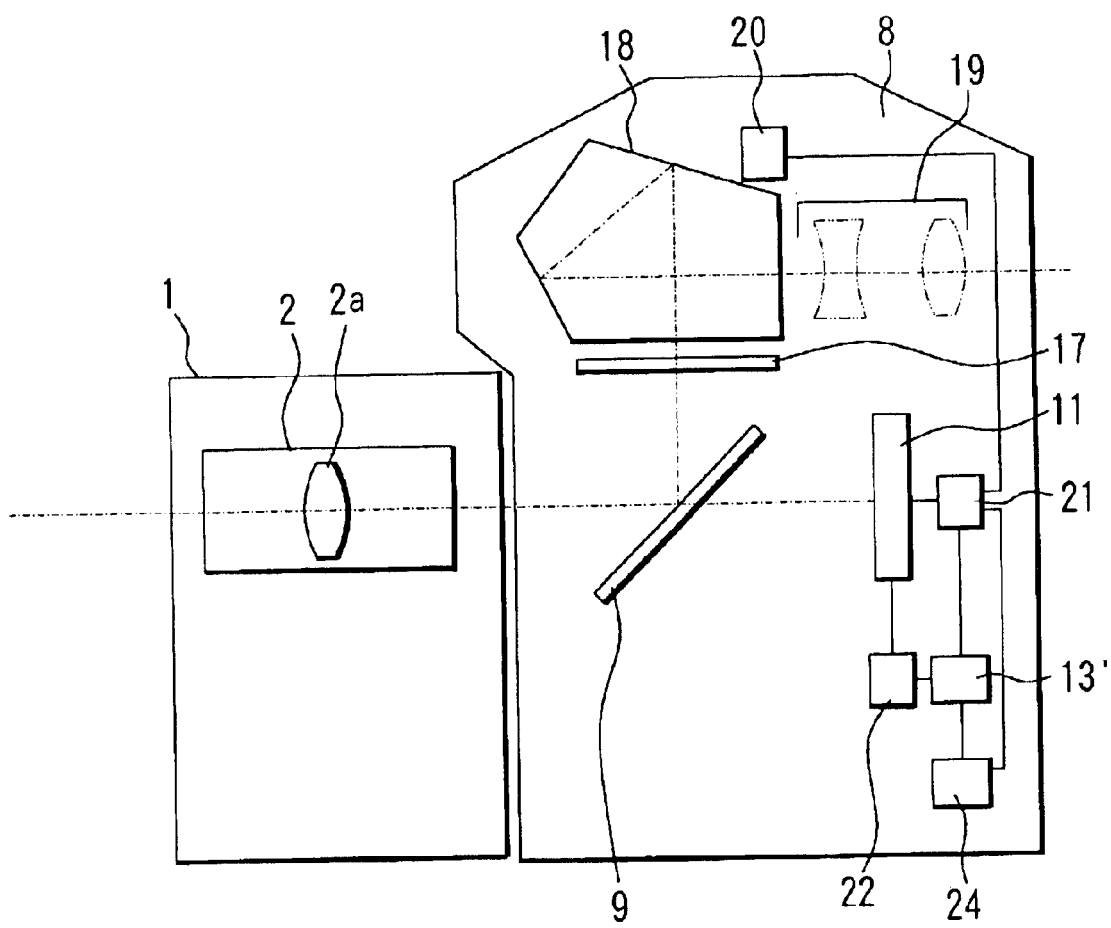
FIG. 8 is a diagram showing the structure of a camera system according to Embodiment 3 of the present invention.

FIG. 8 illustrates the structure of a single lens reflex digital camera according to Embodiment 3 of the present invention. It should be noted that structural elements that are shared with Embodiment 1 are given the same numerals as in Embodiment 1. However, structural elements relating to the in-focus position calibration explained in Embodiments 1 and 2 have been omitted from FIG. 8.

In this embodiment, a photometry unit 20, an exposure control circuit 21 controlling the exposure of the image pickup device 11, an exposure amount detection circuit 22 for detecting an exposure amount of the image pickup device 11, a camera control circuit 13' that also serves as a calculation circuit, and a memory 24 have been added to the structure of the camera 8 of Embodiment 1.

Figure 9:
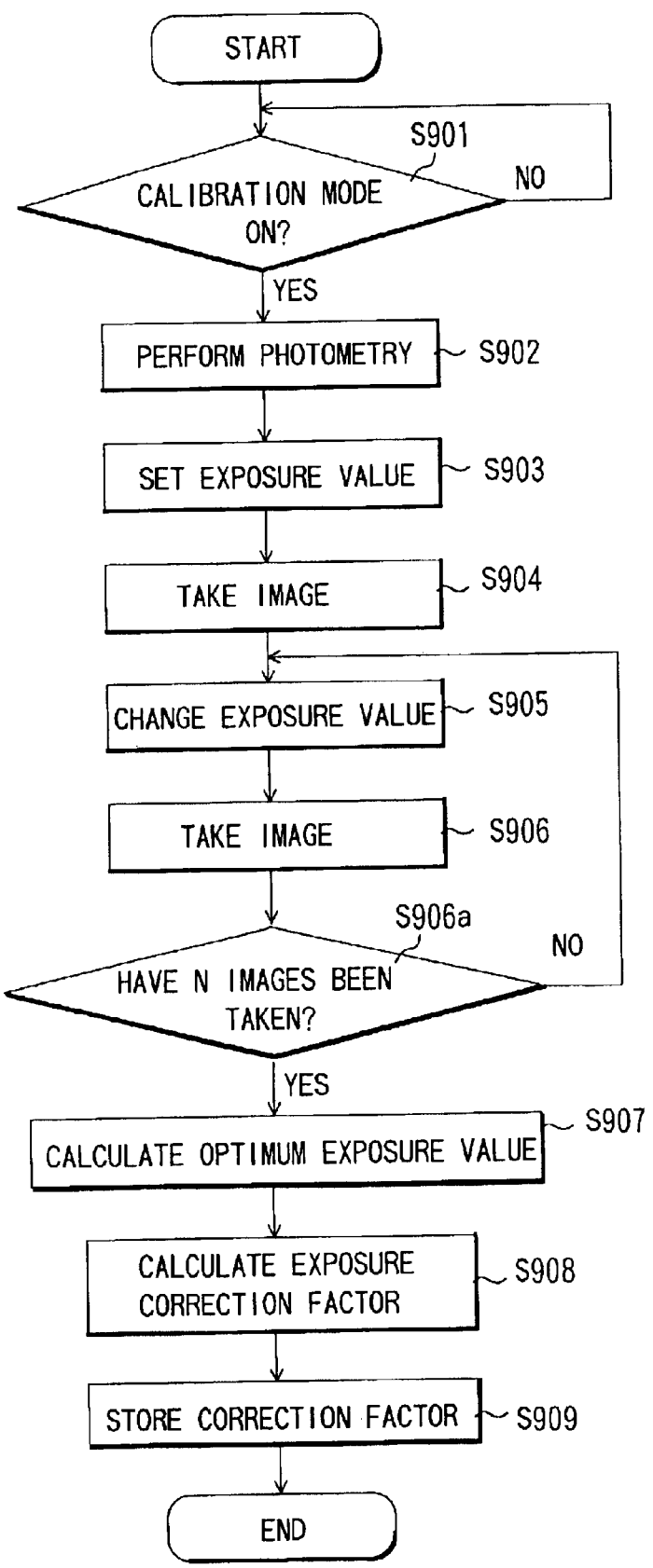
FIG. 9 is a flowchart illustrating the exposure calibration operation in Embodiment 3.

The following is an explanation of the exposure calibration, with reference to the flowchart in FIG. 9.

When the user operates a switch to enter the calibration mode (Step 901), the camera control circuit 13' lets the photometry unit 20 carry out a photometry operation (Step 902). After that, the exposure value is set based on the result of the value of photometry with the photometry unit 12 (Step 903), and an image of the object is taken with the set exposure value (Step 904).

Then, the exposure value set in Step 903 is altered by a predetermined value (Step 905), and an image is taken with this altered exposure value (Step 906). After Step 905 and Step 906 have been repeated for a predetermined N times (Step 906a), the exposure mounts of the N images taken at Step 904 and Step 906, are detected with the exposure amount detection circuit 22, and the exposure value for the best exposure amount of those detected N exposure amounts is calculated and taken as the optimum exposure value (Step 907).

Next, the difference between this optimum exposure value and the exposure value that has been set at Step 903 is calculated by the camera control circuit 13', which also serves as a calculation circuit (Step 908). The camera control circuit 13' stores the calculated difference as the exposure correction factor in the memory 24 (Step 909). This concludes the calibration of the exposure.

Here, it is also possible to perform an exposure calibration by taking images while changing the exposure at the same time as taking a plurality of images when performing the above-described in-focus position calibration.

Figure 10:
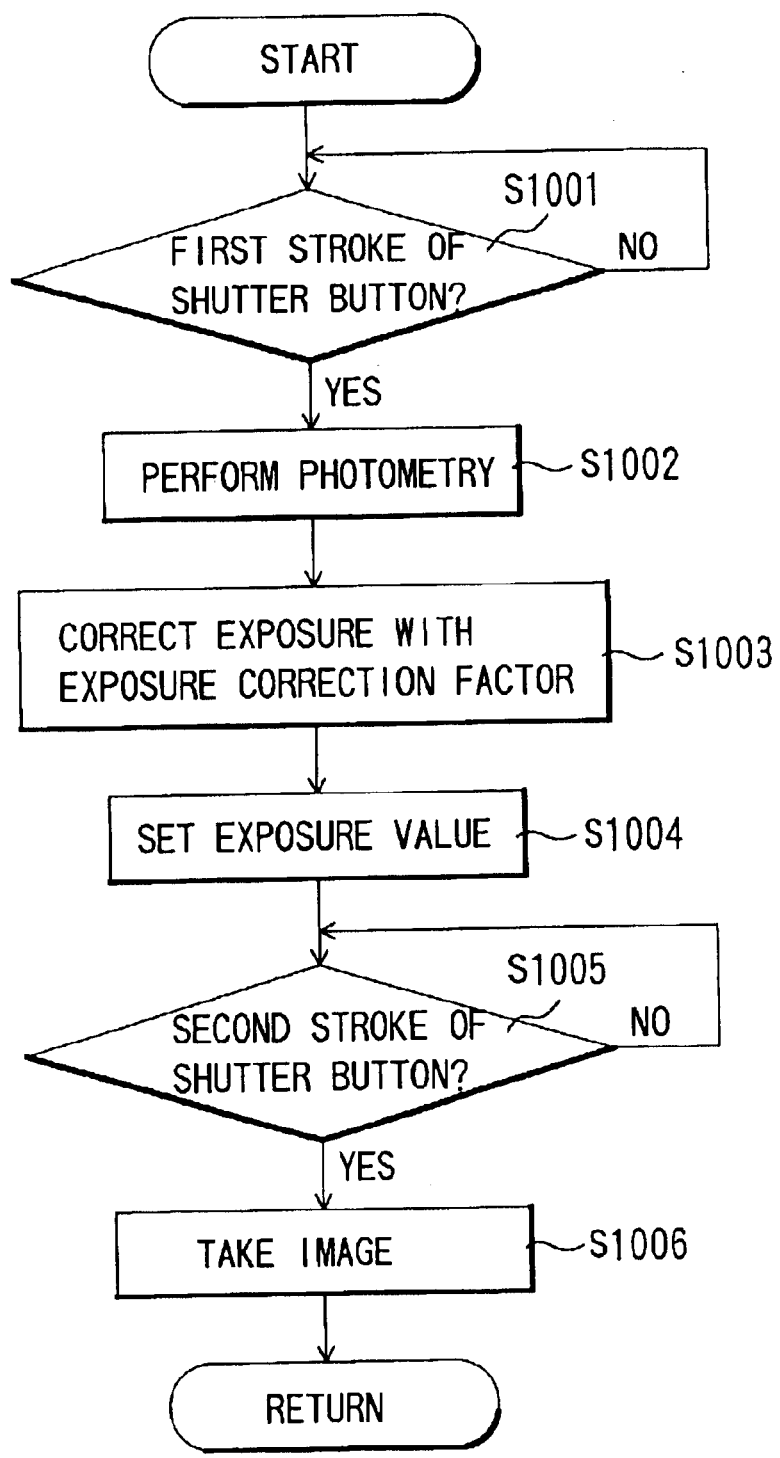
FIG. 10 is a flowchart illustrating the operation of the camera when taking a picture using a correction factor calculated with this exposure position calibration.

Next, the operation of taking an image by using the exposure correction factor calculated by the exposure calibration is explained with reference to the flowchart in FIG. 10.

When the user subjects the shutter button to a first stroke and pushes it half down (Step 1001) then the camera control circuit 13' lets the photometry unit 20 perform photometry operation (Step 1002). Then, the exposure value obtained based on the photometry result with the photometry unit 20 is corrected with the exposure correction factor stored in the memory 24 (Step 1003). Moreover, the exposure value setting during image-taking is performed based on this corrected result (Step 1004).

When the shutter button is subjected to a second stroke and pushed completely down (Step 1005), the camera control circuit 13' performs an image-taking operation (Step 1006).

In this manner, an exposure correction during image-taking is performed by using the exposure correction factor obtained by the exposure calibration, so that an optimum exposure value setting can be attained.

Here, it is preferable that the in-focus position calibration explained in Embodiment 1 and 2 and the exposure calibration explained in this embodiment are performed every time the image-taking lens 1 is exchanged, and therefore it is preferable that if the in-focus position correction factor and the exposure correction factor corresponding to the newly mounted image-taking lens 1 are not stored in the memory 5 of the camera 8, the user is alerted to this fact by a warning tone or display.

Moreover, in the above-described embodiments, the in-focus position correction factor and the exposure correction factor are stored in the storage circuit provided in the camera 8, but it is also possible to overwrite the prior correction value that was stored in the memory provided inside the image-taking lens 1.

With the above-described embodiments, correction information for compensating the inadequacy of the detection precision of phase difference detection method, which is superior with regard to its high speed, is determined based on information indicating the in-focus state obtained by using contrast detection of the image, which allows an in-focus judgment of high precision. Thus, a focusing control can be performed with high precision and at a speed that is faster than in phase difference detection method and hybrid method.

Moreover, when a structure is adopted in which the correction information is stored in a memory in association with individual information of each individual image-taking lens, and the focusing control information is corrected by using the correction information stored in the memory that corresponds to the individual information obtained from the mounted image-taking lens, it becomes possible to correct the detection result detected with the focus detection unit (embodying phase difference detection method) by using correction information matching the optical characteristics unique to each image-taking lens, and it becomes possible to ensure the highest level of precision regardless of the mounted image-taking lens.

What is claimed is:

1. An image pickup apparatus on which art image-taking lens can be mounted and exchanged, comprising:
    an image pickup device that receives an object image formed by the image-taking lens and photoelectrically converts the object image;
    a focus detection unit that detects an amount of defocus of the image-taking lens by phase difference detection method using light from the image-taking lens;
    a contrast detection unit that detects contrast of the object image using an output signal of the image pickup device;
    a processing unit that performs focusing of the image-taking lens; and
    a memory that stores a correction factor obtained from the detection result of the focus detection unit and the detection result of the contrast detection unit when the image-taking lens is mounted, the correction factor depending on the individual image-taking lens;
    wherein the processing unit corrects the detection result of the focus detection unit using the correction factor corresponding to the individual image-taking lens that is mounted when an image-taking operation is performed.

2. The image pickup apparatus according to claim 1, wherein the correction factor is based on the difference between the detection result of the focus detection unit and the detection result of the contrast detection unit.

3. The image pickup apparatus according to claim 1, further comprising a judgment unit that judges whether the image-taking lens is in an in-focus state based on the detection result of the contrast detection unit.

4. The image pickup apparatus according to claim 3, wherein the judgment unti judges repeatedly whether the image-taking lens is in the in-focus state while a focusing lens in the image-taking lens is driven.

5. The image pickup apparatus according to claim 1, wherein it is possible to carry out a calibration operation for obtaining the correction factor every time the image-taking lens is exchanged.

6. The image pickup apparatus according to claim 1, wherein it is possible to carry out a calibration operation for obtaining the correction factor with respect to a plurality of object distances, and the memory stores the correction factor in correspondence with each object distance.

7. An image pickup system having an image-taking lens which can be exchanged, and an image pickup apparatus on which the image-taking lens is mounted, comprising:
    an image pickup device that receives an object image formed by the image-taking lens and photoelectrically converts the object image;
    a focus detection unit that detects an amount of defocus of the image-taking lens by phase difference detection method using light from the image-taking lens;
    a contrast detection unit that detects contrast of the object image using an output signal of the image pickup device;
    a processing unit that performs focusing of the image-taking lens; and
    a memory that stores a correction factor obtained from the detection result of the focus detection unit and the detection result of the contrast detection unit when the image-taking lens is mounted, the correction factor depending on the individual image-taking lens;
    wherein the processing unit corrects the detection result of the focus detection unit using the correction factor corresponding to the individual image-taking lens that is mounted when an image-taking operation is performed.

8. An image pickup apparatus on which an image-taking lens can be mounted and exchanged, comprising:
    an image pickup device that receives an object image formed by the image-taking lens and photoelectrically converts the object image;
    a photometry unit that performs photometry;
    a detecting unit electrically connected to the image pickup device, which detects an exposure amount being received by the image pickup device; and
    a memory that stores a correction factor obtained based on the photometry result of the photometry unit and the detection result of the detecting unit, which is used for correcting the photometry result of the photometry unit in an image taking operation.

9. An image pickup system comprising:
    an image pickup apparatus according to claim 8; and
    an image-taking lens that can be exchanged and mounted on the image pickup apparatus.

10. The image pickup apparatus according to claim 8, wherein it is possible to carry out a calibration operation for obtaining the correction factor every time the image-taking lens is exchanged.

* * * * *